(12) United States Patent
Garza, Jr.

(10) Patent No.: US 8,776,488 B1
(45) Date of Patent: Jul. 15, 2014

(54) MOWER APPARATUS WITH CUTTING MECHANISM ADAPTATION

(76) Inventor: Armando Garza, Jr., Austin, TX (US)

(*) Notice: Subject to any disclaimer, the term of this patent is extended or adjusted under 35 U.S.C. 154(b) by 140 days.

(21) Appl. No.: 13/327,104

(22) Filed: Dec. 15, 2011

(51) Int. Cl.
*A01D 34/835* (2006.01)
*A01D 34/40* (2006.01)

(52) U.S. Cl.
USPC .............................................. 56/238; 56/293

(58) Field of Classification Search
USPC .................... 56/249, 251, 252, 293, 294, 238
See application file for complete search history.

(56) References Cited

U.S. PATENT DOCUMENTS

| | | | | | |
|---|---|---|---|---|---|
| 1,428,284 | A | * | 9/1922 | Heimann | 56/246 |
| 2,032,701 | A | * | 3/1936 | Jones | 56/238 |
| 2,044,159 | A | * | 6/1936 | Durst | 56/238 |
| 2,535,878 | A | * | 12/1950 | Swenson | 56/293 |
| 2,630,668 | A | * | 3/1953 | McDermott | 56/238 |
| 2,710,517 | A | * | 6/1955 | Huddon | 56/258 |

* cited by examiner

*Primary Examiner* — Alicia Torres
(74) *Attorney, Agent, or Firm* — Ana G. Luther (57) ABSTRACT

An apparatus for cutting vegetation is disclosed. The apparatus comprises a first and second cutting mechanism for cutting vegetation. The first cutting mechanism is configured to cut vegetation from an original height to a first height. The original height is a height greater than a height reachable by the second cutting mechanism. The second cutting mechanism is configured to cut the same vegetation from the first height to a second height, after the first cutting mechanism has cut the vegetation to the first height.

18 Claims, 7 Drawing Sheets

FIG. 5 PIN ASSEMBLY

FIG. 6
TOTAL ASSEMBLY FRONT

FIG. 7

MOWER APPARATUS WITH CUTTING MECHANISM ADAPTATION

FIELD OF THE INVENTION

This invention relates generally to the field of mowers, and more particularly, to push reel mowers with cutting mechanisms for cutting vegetation.

DESCRIPTION OF THE RELATED ART

Push reel mowers are utilized by consumers and businesses seeking to cut vegetation (e.g., grass and weeds) in an inexpensive and environmentally friendly manner. Push reel mowers depend on a manual pushing force to trigger blades that cut vegetation. This is contrary to traditional lawn mowers that rely on gas or electric powered motors to trigger blades that cut vegetation. Thus, utilizing a push reel mower can significantly reduce the environmental impact of cutting vegetation.

When using a push reel mower, vegetation is cut by blades within the push reel mower. These blades are triggered by a pushing force applied by a user. Once triggered, blades begin rotating and cutting vegetation that comes into contact with such blades. In some situations, vegetation is taller than a height reachable by such blades. Attempting to cut vegetation that is taller than the height reachable by such cutting blades can be problematic and ineffective.

BRIEF DESCRIPTION OF THE DRAWINGS

The present invention may be better understood, and its numerous objects, features and advantages made apparent to those skilled in the art by referencing the accompanying drawings.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

Figure 1:
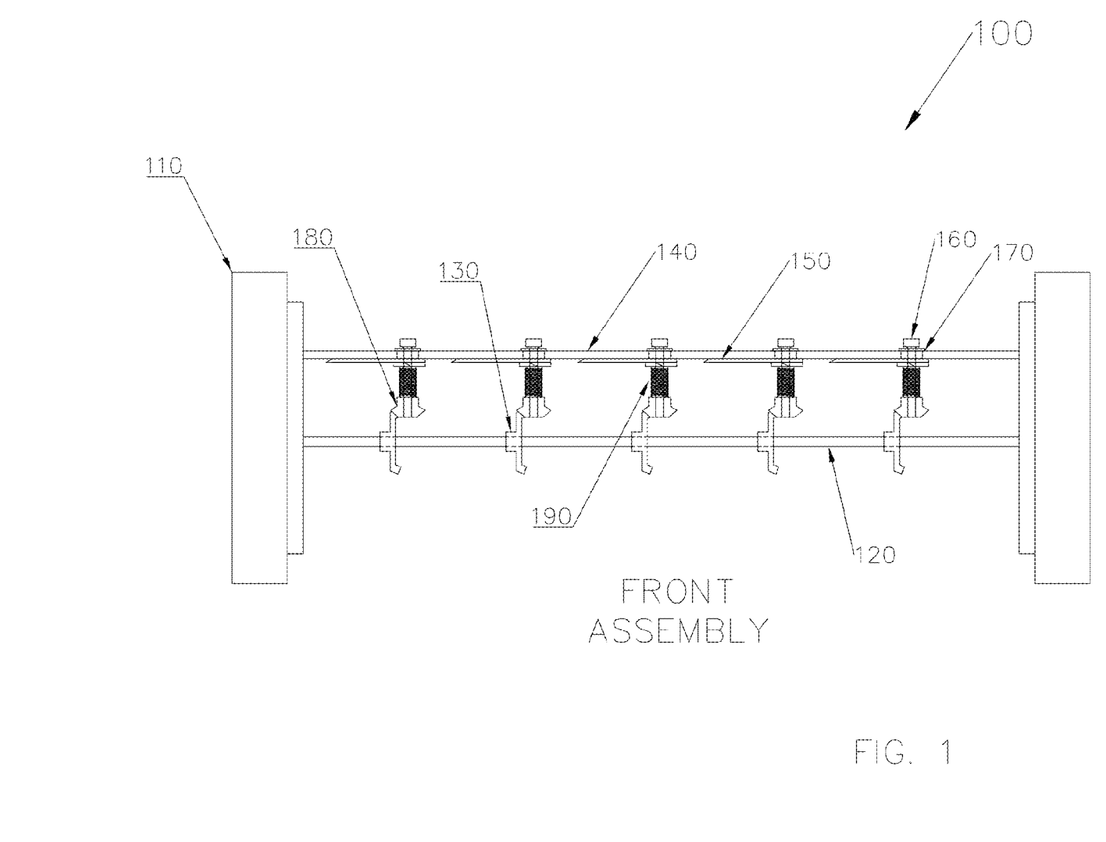
FIG. 1 illustrates a mower assembly with a cutting mechanism adaptation, according to one embodiment of the invention.

FIG. 1 illustrates a push reel mower assembly 100. Push reel mower assembly 100 includes a cutting mechanism adaptation usable for cutting vegetation that is taller than a height reachable by traditional cutting mechanisms within a push reel mower. The cutting mechanism adaptation of FIG. 1 serves to cut tall vegetation to a first height. Doing so allows traditional cutting mechanisms (not shown) to cut the same vegetation from the first height to a second height. Combining the two cutting mechanisms together thus allows a single push reel mower to cut vegetation that is taller than a height reachable by typical cutting mechanisms, while retaining the same environmental benefits.

In cases where two cutting mechanisms are not combined, tall vegetation encountered by a push reel mower can remain uncut altogether. This is because the set of cutting blades in a traditional push reel mower can be prevented from reaching the tall vegetation whenever the push reel mower is operated. As a push reel mower approaches tall vegetation, the mechanics of the cutting mechanism assembly prevents the set of cutting blades from trapping and cutting the tall vegetation. In these cases, a gas or electric powered lawn mower may be needed to cut tall vegetation to a height reachable by the set of cutting blades in a traditional push reel mower. Relying on a gas or electric powered lawn mower before being able to use a push reel mower significantly reduces the practicality and environmental attractiveness of using a push reel mower in the first place.

The cutting mechanism of FIG. 1 allows a user of a push reel mower to cut vegetation to a first height (e.g., via a cutting mechanism adaptation) that is then reachable by a set of cutting blades within a push reel mower. Push reel mower assembly 100 includes wheels 110. Push reel mower assembly 100 also includes a cutting mechanism adaptation, which further includes rod 120, bottom beveled gears 130, bracket 140, blades 150, pins 160, ball bearings 170, top beveled gears 180, and springs 190. Although not shown, push reel mower assembly 100 can also include more or less components than those illustrated in FIG. 1.

Rod 120 is a shaft and can be made of materials (e.g., metal or non-metal) that allow for the transfer of motion. Rod 120 can also be hollow or solid. In addition, rod 120 can be shaped in one of many forms, so long as rod 120 allows for bottom beveled gears 130 to fit onto rod 120. As an example, rod 120 can be a solid, cylindrical shape made of stainless steel material. Rod 120 is also connected perpendicular to each wheel 110. Rod 120 can be securely held in place relative to the inner portion of wheels 110 via a holding plate and ball bearing within wheels 110. By connecting rod 120 to wheels 110 via gears, rod 120 is automatically triggered to begin rotating as wheels 110 are spun by a user of a push reel mower.

The location in which rod 120 is connected to each wheel 110 defines the height at which blades 150 are located. Specifically, rod 120 can be connected to each wheel 110 at any location along a predetermined perimeter of each wheel 110. The location in which rod 120 is connected to each wheel 110 defines the resulting location of blades 150, given the manner in which the components of the cutting mechanism adaptation fit and operate together.

The rotation of rod 120 triggers the rotation of bottom beveled gears 130, top beveled gears 180, and blades 150. Thus, if a different height for blades 150 is desired, the location in which rod 120 is connected to each wheel 110 should be varied accordingly. For example, if blades 150 are to be located lower to the ground, rod 120 can be connected to each wheel 110 at a location along the outer perimeter that is closer to the bottom of each wheel 110. Alternatively, if a taller height is desirable for blades 150, rod 120 can be connected to each wheel 110 at a location along the outer perimeter that is closer to the top of each wheel 110.

Rod 120 begins rotating when push reel mower assembly 100 is operated by a user. A user can operate the push reel mower, for example, by applying a pushing force to a handle that is connected to push reel mower assembly 100. For example, if push reel mower assembly 100 is pushed by a user via a handle, the pushing motion causes wheels 110 to move forward and rod 120 to begin rotating, thereby triggering the operation of blades 150 to begin cutting vegetation.

A push reel mower assembly 100 can also be configured to provide optional functionality of the cutting mechanism adaptation. This can be achieved, for example, by adding a cable to push reel mower assembly 100 that is controlled by a lever for engaging or disengaging rod 120. Such a cable can be attached to the handle of a push reel mower assembly 100, from which a user can operate the cable to engage or disengage rod 120. Providing a user with an option of engaging or disengaging rod 120 can be desirable in cases where the functionality provided by the cutting mechanism adaptation is not always needed. As an example, a cutting mechanism adaptation may be needed whenever vegetation is taller than a height reachable by a set of cutting blades typically included in a push reel mower. However, the cutting mechanism adaptation may not be needed whenever the height of vegetation is within a height reachable by the set of cutting blades typically included in a push reel mower. Making use of the cutting mechanism adaptation requires extra pushing force on behalf of a user. Thus, disengaging rod 120 whenever possible can significantly reduce the amount of force needed to operate a push reel mower.

Rod 120 also includes a set of bottom beveled gears 130. As shown, rod 120 includes a set of five bottom beveled gears 130. In other embodiments, however, rod 120 can include more or less bottom beveled gears 130 than those illustrated in FIG. 1. Bottom beveled gears 130 can be connected to rod 120, in one of several ways, to ensure that each bottom beveled gear 130 is secured to rod 120 and does not move during operation. For example, bottom beveled gears 130 can be connected to rod 120 via set screws made of hardened steel. Alternatively, bottom beveled gears 130 can be connected to rod 120 by welding each bottom beveled gear 130 to rod 120.

The spacing between the bottom beveled gears 130 can be varied. Each bottom beveled gear 130 is coupled to a corresponding set of blades 150 (e.g., via bracket 140, pins 160, top beveled gears 180, and springs 190). Thus, the spacing between bottom beveled gears 130 should be enough to allow each set of blades 150 to rotate completely without interfering with neighboring set of blades.

Each bottom beveled gear 130 is a circular rotating machine part with teeth along the outer edges. The teeth along the outer edges of bottom beveled gears 130 are in direct contact with interlocking teeth located along the outer edges of corresponding top beveled gears 180. By using interlocking teeth at bottom beveled gears 130 and top beveled gears 180, torque motion can be transferred from bottom beveled gears 130 to top beveled gears 180 without slipping. As shown, bottom beveled gears 130 are larger in size than top beveled gears 180, thereby creating different rotational speeds and torque for bottom beveled gears 130 and top beveled gears 180.

Once rotational speed and torque is transferred from bottom beveled gears 130 to top beveled gears 180, pins 160 are triggered to being rotating, which in turns triggers the rotation of blades 150 to begin cutting vegetation. In other embodiments, rotational speed and torque can be transferred by other means. For example, rotational speed and torque can also be transferred by use of axles, sprockets and chains or bands and pulleys between rod 120 and blades 150.

The cutting mechanism of FIG. 1 also includes bracket 140. Bracket 140 is likewise attached to each wheel 110. One way to attach bracket 140 to the inner portion of each wheel 110 is to weld or glue bracket 140 to each wheel 110. Bracket 140 is made of a hardened steel material, such as stainless steel, to ensure bracket 140 withstands the weight of blades 150. As shown, bracket 140 includes five sets of blades 150 for cutting vegetation. Such vegetation is cut to a height that is equivalent to the height of blades 150. In some embodiments, a push reel mower assembly 100 can also include an adjustable height bracket that varies the height of blades 150 and therefore the height at which vegetation is cut by blades 150. Such an adjustable height bracket can be connected to wheels 110 and/or blades 150.

Each set of blades 150 is made up of two or more blades for cutting vegetation. Each set of blades 150 includes at least one fixed blade and at least one rotating blade. As the one or more rotating blades come in contact with the fixed blades, vegetation caught between the blades is cut. Spring 190 is used to maintain compression between blades 150. A blade protection guard can also be added to push reel mower assembly 100 to help protect the user from coming in contact with blades 150.

Each set of blades 150 is connected to and held against bracket 140 via pins 160, ball bearings 170, and springs 190. Example materials for pin 160 and ball bearings 170 can include galvanized coated steel, stainless steel, iron, and brass. Example materials for springs 190 can include stainless steel or other types of materials that possess corrosion-free characteristics.

The head of each pin 160 is wider than the body of pin 160 and configured to fit tightly against one side of bracket 140 via a ball bearing 170. The head of each pin 160 is therefore located on the opposite side of bracket 140, as compared to blades 150. Ball bearing 170, which is used to connect the head of pin 160 to bracket 140, mechanically attaches the pin to the bracket, keeping the pin in place, while minimizing friction experienced throughout the operation of a push reel mower assembly 100. The body of each pin 160 passes through ball bearing 170, through bracket 140, through blades 150, and top beveled gear 180. Pin 160 is connected to top beveled gear 180 via a set screw. Alternatively, pin 160 can be glued or welded to top beveled gear 180.

Springs 190 are used to maintain clearances between blades 150. Maintaining clearances between blades 150 allows blades 150 to remain in place throughout the operation of push reel mower assembly 100 and allows blades 150 to cut vegetation encountered by blades 150. Spring 190 is formed like a coil and wraps around the body of pin 160 between top beveled gears 180 and blades 150.

As assembled, the rotation of wheels 110 causes rod 120 to begin rotating, which in turn causes bottom beveled gears 130 and top beveled gears 180 to begin rotating in opposite directions. Whenever top beveled gear 180 begins rotating, pin 160 begins rotating as a result. The rotation of pin 160 causes the one or more rotating blades 150 to begin rotating as well. Whenever the one or more rotating blades approach the fixed blade, any vegetation coming in contact with the sharpened edges of blades 150 will be cut. Vegetation is cut to a height that is equivalent to the height of blades 150. Doing so then allows such vegetation to be cut a second time by a set of cutting blades typically found within push reel mowers.

Figure 2:
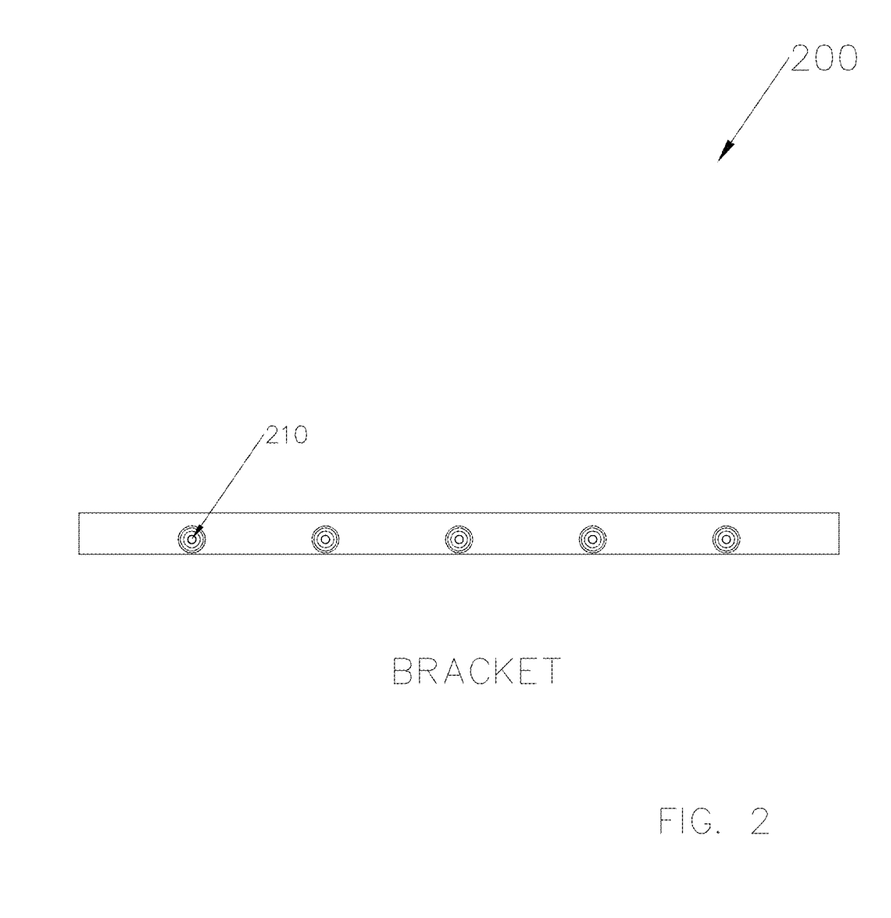
FIG. 2 illustrates a bracket used within a cutting mechanism adaptation, according to one embodiment of the invention.

FIG. 2 illustrates a bracket 200 (e.g., such as bracket 140 of FIG. 1). Bracket 200 is a support bar used to hold the blade assembly for a cutting mechanism adaptation. Bracket 200 is typically made of a rigid material, which is able to support the combined weight of all blade assemblies. For example, bracket 200 can be made of steel, aluminum, or plastic.

As shown, bracket 200 is a rectangular support bar with five sets of holes 210. Bracket 200 is typically long and slender. An example dimension for the width of bracket 200 is around 1-2 inches. The length of bracket 200 is equivalent to the space that exists between wheels in a push reel mower (e.g., the spacing between wheels 110 in FIG. 1).

The number of holes 210 on bracket 200 can vary. Holes 210 are holes drilled into bracket 200 for the purpose of passing a pin assembly from one side of bracket 200 to the other. A pin assembly passed through bracket 200 is used to hold a set of blades against bracket 200 throughout the operation of a push reel mower. Thus, the number of holes 210 drilled onto bracket 200 is typically equivalent to the number of blade assemblies used by a cutting mechanism. Although not shown, bracket 200 can include more or less holes 210 to correspond with the number of desirable blade assemblies in a cutting mechanism adaptation.

Holes 210 may be spaced at even distances from each other and from the ends of bracket 200. As shown, holes 210 are spaced equally from one another. As an example, holes 210 may be spaced around 3.5-4.5 inches apart, whenever five holes are used. It is possible, however, to have holes 210 be spaced unevenly from each other, so long as the spacing between two adjacent holes 210 allows for the operation of neighboring blade assemblies without interference.

Figure 3:
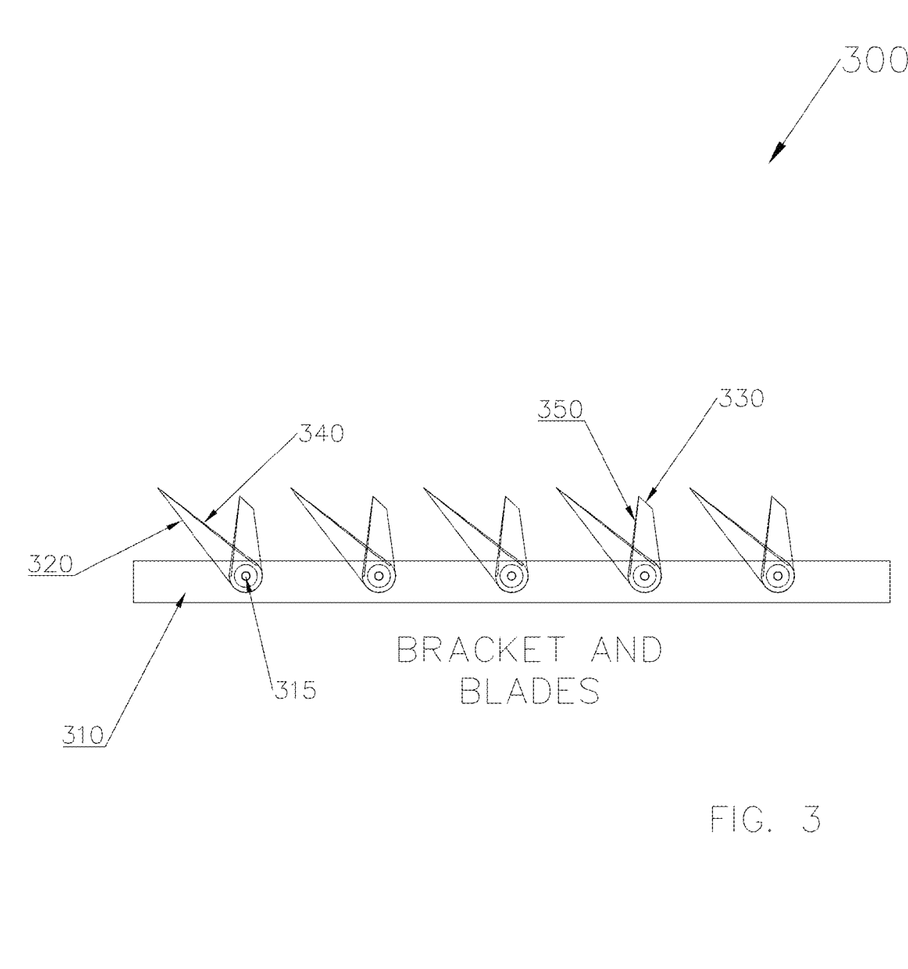
FIG. 3 illustrates a bracket with blade assemblies, according to one embodiment of the invention.

FIG. 3 illustrates a bracket and blade assembly configuration 300. As shown, bracket and blade assembly configuration 300 includes a bracket 310 with a set of holes 315. Through each hole 315 is a set of blades consisting of a fixed blade 320 and a rotating blade 330. Although not shown, bracket 310 can include more or less holes 315, more or less blades 320, and more or less blades 330 than those shown in FIG. 3.

Fixed blades 320 and rotating blades 330 are typically made of the same material, although the material used for fixed blades 320 and rotating blades 330 may differ. The material selected for fixed blades 320 and rotating blades 330 should be one that has enough rigidity to withstand frequent and extensive use of a blade assembly. In addition, the material selected for fixed blades 320 and rotating blades 330 should also be able to withstand moisture and remain corrosion-free. Fixed blades 320 and rotating blades 330 may come into contact with water whenever such blades are pushed along wet or damp vegetation. As such, the material of such blades should be one that helps prevents corrosion due to moisture. An example material that can be used for fixed blades 320 and rotating blades 330 is stainless steel.

Each set of fixed blades 320 and rotating blades 330 are held together by a pin assembly that runs through each hole 315. This pin assembly aligns and compresses fixed blades 320 and rotating blades 330, which ensures that fixed blades 320 and rotating blades 330 are pressed together throughout the operation of a push reel mower to create a scissor-like cutting motion. In order to create a scissor-like cutting motion, fixed blades 320 and rotating blades 330 are maintained in direct contact with each other via curved leading edges to ensure thorough cutting of vegetation. In some embodiments, a pressure adjustment component can also be added to a push reel mower to apply varying levels of pressure between fixed blades 320 and rotating blades 330.

One edge of each fixed blade 320 and each rotating blade 330 is sharpened. These sharpened edges are illustrated as sharpened edges 340 and 350. Each sharpened edge 340 corresponds to a sharpened edge of a fixed blade 320, and each sharpened edge 350 corresponds to a sharpened edge of a rotating blade 330. Vegetation is cut as sharpened edge 350 of a rotating blade 330 comes in contact with sharpened edge 340 of a fixed blade 320 and continues rotating past fixed blade 320. The rotation of rotating blade 330 creates a scissor-like motion that traps vegetation between sharpened edges 340 and 350, thereby cutting vegetation to a height that is equal to the height of fixed blades 320 and rotating blades 330, as measured from the base of a push reel mower.

Rotating blade 330, as shown, is the bottom blade and sits directly against bracket 310. Fixed blade 320, as shown, is the top blade and sits directly on top of rotating blade 330. Alternatively, fixed blade 320 and rotating blade 330 can be swapped to have fixed blade 320 become the bottom blade and rotating blade 320 become the top blade.

Fixed blade 320 remains fixed throughout the operation of a push reel mower. The position of fixed blade 320, relative to bracket 310, can determine the reach of vegetation that can be trapped between fixed blades 320 and rotating blades 330. This is because fixed blade 320 guides vegetation encountered by fixed blade 320 towards the edge of rotating blade 330 to result in the cutting of such vegetation. As an example, fixed blade 320 can be positioned to provide a forty-five degree angle relative to bracket 310. Other positions for fixed blade 320 can also be utilized.

The size and shape of fixed blades 320 and rotating blades 330 can be varied according to the number of blade assemblies used along bracket 310 and the height clearances offered by a push reel mower assembly. For example, fixed blade 320 may be the same size and shape as rotating blade 330. Alternatively, fixed blade 320 and rotating blade 330 may be of different sizes and shapes. Any combination of sizes and shapes that allows the two blades to trap and cut vegetation without interfering with neighboring blades can also be employed.

Figure 4:
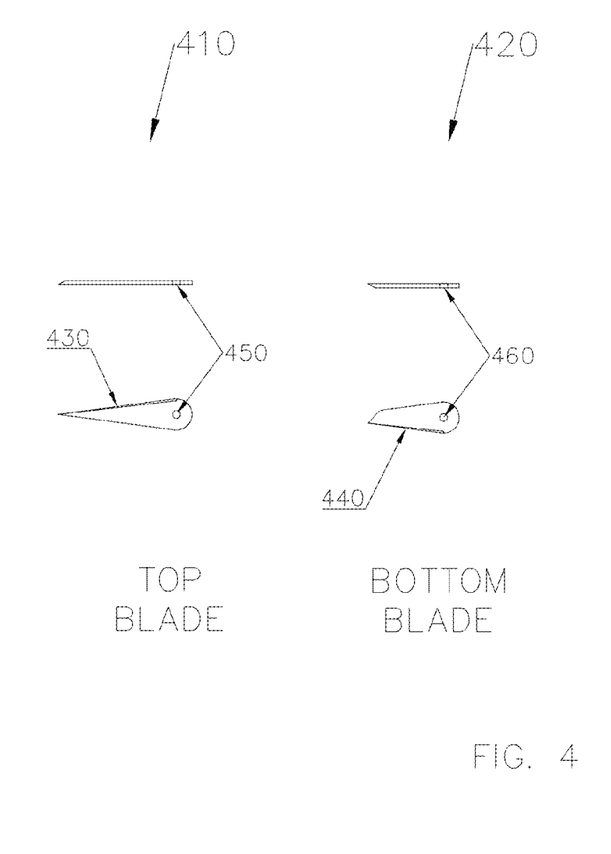
FIG. 4 illustrates a top blade and bottom blade, according to one embodiment of the invention.

FIG. 4 illustrates a top blade 410 (e.g., such as fixed blade 320 of FIG. 3) and bottom blade 420 (e.g., such as rotating blade 330 of FIG. 3). As shown, top blade 410 and bottom blade 420 are of different sizes and of different shapes. Alternatively, top blade 410 and bottom blade 420 can also be of the same size and shape.

As shown, top blade 410 has a cone-like shape with two edges of equal length and a third rounded edge. Top blade 410 can also have other shapes that include pointy edges, rounded edges, semi-rounded edges, square edges, and so on. In addition, the edges of top blade 410 can also have equal or unequal lengths. As shown, one edge of top blade 410 is sharpened. This edge is illustrated as sharpened edge 430 and is used to cut vegetation.

Top blade 410 also includes a hole 450 near the rounded edge. Hole 450 is hollow and allows a pin assembly to pass through from one side of top blade 410 to the other. By passing a pin assembly through hole 450, top blade 410 is aligned and secured in place during operation. The sides of top blade 410 can be flattened or rounded. As shown, top blade 410 includes a slightly rounded top side and a flat bottom side. Alternatively, the top and bottom sides of top blade 410 can both be flattened and of equal lengths. Additionally, the bottom side of top blade 410 includes curvature to allow top blade 410 to come in contact with bottom blade 420 at a single point during operation, to produce a scissor-like motion.

The size of top blade 410 can depend on various factors, including the desired reach of such a blade and the number of blade assemblies to be used within a bracket. An example set of dimensions for top blade 410 can be approximately 3-4 inches in length, as measured from the center of hole 450 to the opposite edge of top blade 410, and approximately 0-0.25 inches in thickness.

Bottom blade 420, as shown, has a different shape than that of top blade 410. As shown, bottom blade 420 has a more rectangular-like shape with three flat edges of unequal lengths and one rounded edge. Bottom blade 420 can also have other shapes that include pointy edges, rounded edges, semi-rounded edges, square edges, and so on. The edges of bottom blade 420 can also have equal or unequal lengths. One edge of bottom blade 420 is sharpened, as illustrated by sharpened edge 440, and is used to cut vegetation.

Bottom blade 420 also includes a hole 460 near the rounded edge to allow a pin assembly to pass through from one side of bottom blade 420 to the other. Doing so allows bottom blade 420 to be aligned and secured during operation of a push reel mower. The sides of bottom blade 420 can be flattened or rounded. As shown, bottom blade 420 includes a flattened top side and a rounded bottom side. Alternatively, the top and bottom sides of bottom blade 420 can be flattened and of equal lengths. The top side of bottom blade 420 includes curvature to allow bottom blade 420 to come in contact with top blade 410 at a single point during operation. Doing so produces a scissor-like motion.

The size of bottom blade 420 can also vary according to a desired reach of bottom blade 420 and the number of blade assemblies to be used within a bracket. An example set of dimensions for top blade 420 can be approximately 2-3 inches in length, as measured from the center of hole 460 to the opposite edge of bottom blade 420, and approximately 0-0.25 inches in thickness.

Figure 5:
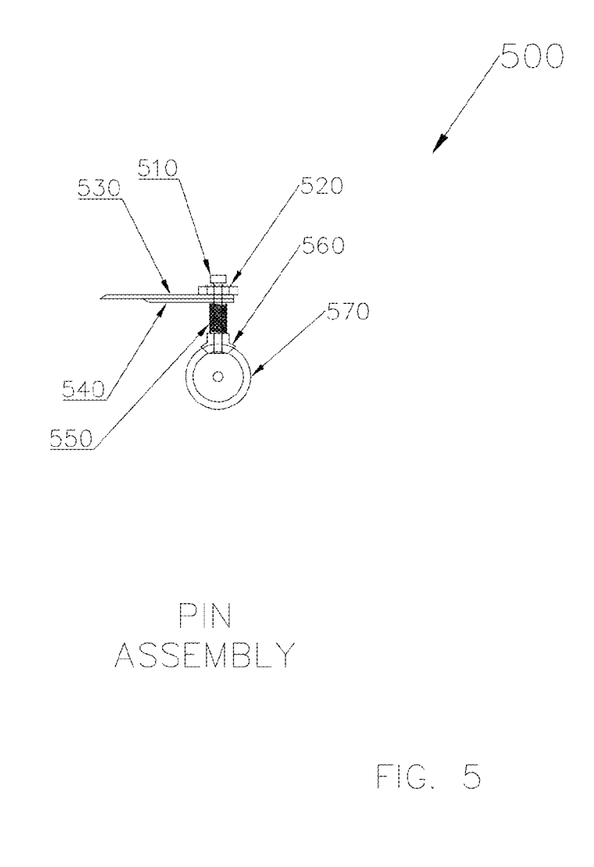
FIG. 5 illustrates a pin assembly, according to one embodiment of the invention.

FIG. 5 illustrates a pin assembly 500. Pin assembly 500 includes a pin 510, a ball bearing 520, a top blade 530, a bottom blade 540, a blade spring 550, a top beveled gear 560, and a bottom beveled gear 570. Pin 510 is a device used to fasten and align inner bushings of ball bearing 520, top blade 530, bottom blade 540, blade spring 550, top beveled gear 560, and bottom beveled gear 570 together.

Pin 510 can be made of a variety of structurally rigid and corrosion-free materials. Some example materials for pin 510 include steel, galvanized coated steel, brass, or copper. Pin 510 includes a head and a slender body. One example of pin 510 can be a 0.25 inch grooved pin. The head of pin 510 sits on top of ball bearing 520. The slender body of pin 510 runs through a bracket (not shown), top blade 530, bottom blade 540, blade spring 550, top beveled gear 560, and bottom beveled gear 570. The use of pin 510 prevents the components of pin assembly 500 from disengaging and/or misaligning during operation of a push reel mower.

Applying a pushing force to a push reel mower causes pin 510 to rotate, which subsequently causes bottom blade 540 to rotate correspondingly. This is because of the way that pin 510 and bottom blade 540 are interconnected. Pin 510 is attached to bottom blade 540 by matching a groove on pin 510 with a hole on bottom blade 540. The hole on bottom blade 540 is shaped to match the groove on pin 510 in order to have the rotation of pin 510 trigger the rotation of bottom blade 540. By contrast, the hole on top blade 530 is not matched to the groove on pin 510. Instead, the hole on top blade 530 is completely round and allows pin 510 to rotate through such a hole without triggering the rotation of top blade 530. For example, pin 510 and the hole on bottom blade 540 can be shaped as a semi-circle while the hole on top blade 530 can be shaped as a circle that allows for the rotation of pin 510.

In operation, the rotation of pin 510 causes the rotation of bottom blade 540. As bottom blade 540 rotates, bottom blade 540 comes in contact with top blade 550 to cut vegetation. This happens as a sharpened edge of bottom blade 540 approaches a sharpened edge of top blade 530. Any vegetation caught between the two sharpened edges is cut along the way.

Ball bearing 520 is a ring-shaped device used to transmit motion between moving parts while minimizing friction. As shown, ball bearing 520 sits between the head of pin 510 and top blade 530. The body of pin 510 is passed through the inside hollow portion of ball bearing 520 to reduce rotational friction caused by the rotation of pin 510. Ball bearing 520 can be made of several structurally rigid materials, such as galvanized coated steel, stainless steel, chrome steel, and ceramic.

Top blade 530 and bottom blade 540 are cutting devices used within a cutting mechanism adaptation. As shown, top blade 530 and bottom blade 540 are located between ball bearing 520 and blade spring 550. Top blade 530 and bottom blade 540 can be made of several different corrosion-free and structurally rigid materials. One example material is stainless steel. In addition, top blade 530 remains in contact with bottom blade 540 at all times. By doing so, top blade 530 and bottom blade 540 can create a scissor-like cutting motion during the operation of a push reel mower. Vegetation caught between the sharpened edges of top blade 530 and bottom blade 540 is cut.

Blade spring 550 is an elastic device used to store mechanical energy. As shown, blade spring 550 is located between bottom blade 540 and top beveled gear 560. Blade spring 550 can be made of stainless steel, other hardened steel materials, bronze, titanium, and so on. Ideally, the material selected for blade spring 550 is one that is structurally rigid, elastic, and corrosion-free.

Blade spring 550 keeps compression between top blade 530 and bottom blade 540 throughout the operation of a push reel mower. Keeping compression between top blade 530 and bottom blade 540 at all times serves to keep top blade 530 and bottom blade 540 in position and in direct contact with each other during the operation of a push reel mower. Failure to keep a proper amount of compression between the blades can prevent the scissor-like motion needed to cut vegetation. In addition, maintaining compression between top blade 530 and bottom blade 540 also serves to keep tight clearances between blades, particularly as the blades wear out.

Top beveled gear 560 is a rounded gear device that includes teeth along the outer edges. Similarly, bottom beveled gear 570 is a cylindrical gear that also includes teeth along the outer edges. Top beveled gear 560 and bottom beveled gear 570 should be made of structurally rigid and corrosion-free material. Examples of such materials include stainless steel, plastic, aluminum, and brass.

Top beveled gear 560 and bottom beveled gear 570 are joined together with teeth to prevent slipping and to transmit torque and rotational energy from one component to the other. During operation of a push reel mower, the rotation of bottom beveled gear 570 transmits torque and rotation to top beveled gear 560. The transferred torque and rotation of top beveled gear 560 causes the rotation of pin 510, which causes the rotation of bottom blade 540 and ultimately the cutting of vegetation by top blade 530 and bottom blade 540.

In other embodiments, top beveled gear 560 and bottom beveled gear 570 can be replaced with wheels to form a pulley system that can also transmit torque and rotational speed from one set of components to another. In addition, a belt and pulley or a chain and sprocket combination can also be employed instead of top beveled gear 560 and bottom beveled gear 570.

Figure 6:
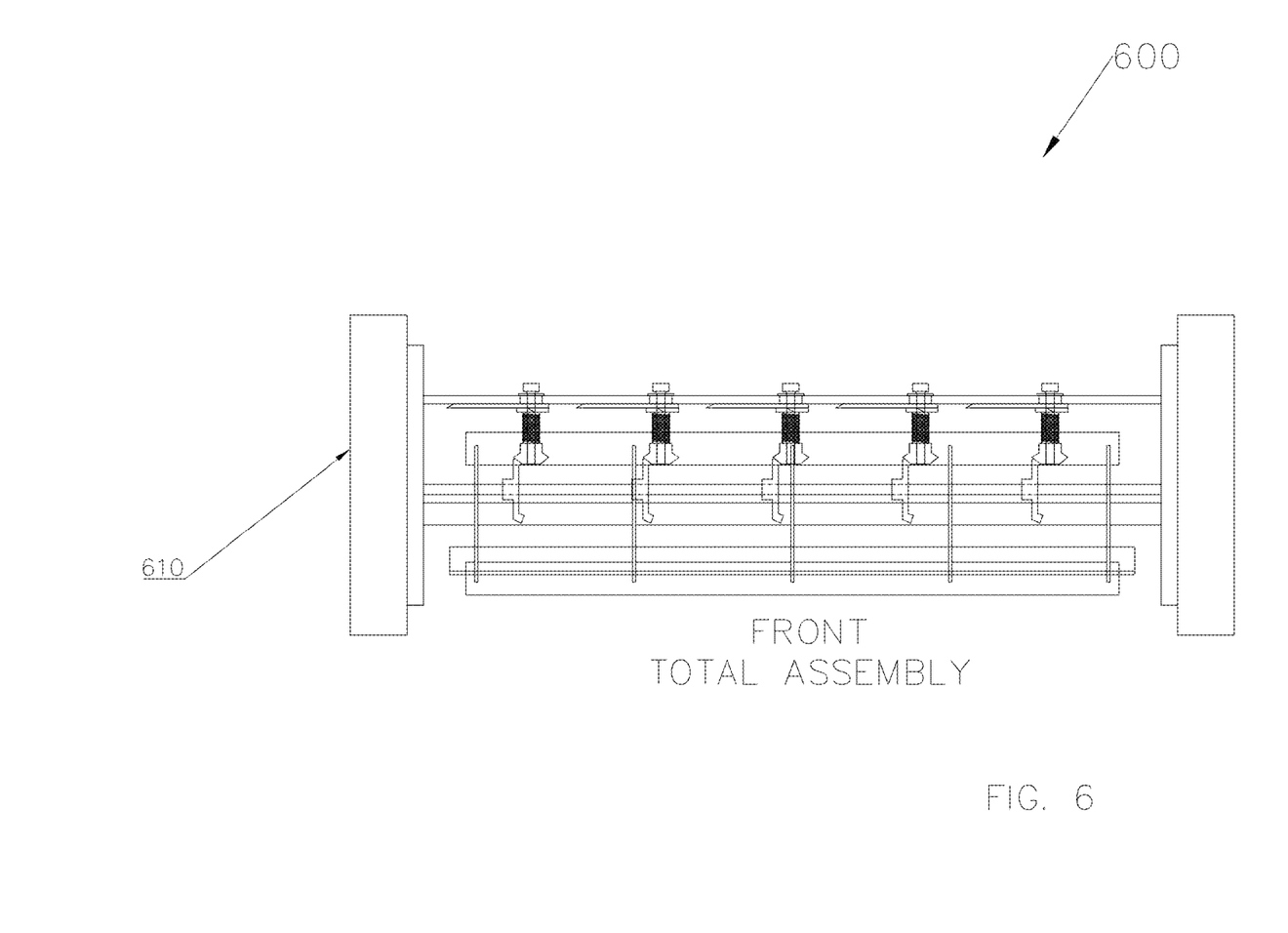
FIG. 6 illustrates a front view of a mower assembly with two cutting mechanisms, according to one embodiment of the invention.

FIG. 6 illustrates a front view of a push reel mower assembly 600 with a total of two cutting mechanisms. Push reel mower implementation 600 includes a set of wheels 610. Located between wheels 610 are two cutting mechanisms (e.g., a traditional cutting mechanism and a second cutting mechanism, such as the cutting mechanism adaptation shown in FIG. 1). The cutting mechanism adaptation is located in front of and above traditional cutting mechanism to allow the cutting mechanism adaptation to reach vegetation first and cut such vegetation to a height that is then reachable by traditional cutting mechanisms.

When push reel mower assembly 600 is in operation (e.g., wheels 610 are being pushed), the rotation of wheels 610 triggers the rotation of both cutting mechanisms. As vegetation is encountered, the cutting mechanism adaptation reaches the vegetation first and cuts the vegetation to a first height (e.g., a height reachable by traditional cutting mechanisms). Thereafter, the same vegetation is encountered by traditional cutting mechanisms, which then cut the vegetation to a second height.

In cases where vegetation is not taller than a height reachable by the cutting mechanism adaptation, the cutting mechanism adaptation can be disengaged. When the cutting mechanism adaptation is disengaged, vegetation is cut only once by traditional cutting mechanisms. Disengaging a cutting mechanism adaptation in this scenario translates into less force needed to operate push reel mower assembly 600.

Figure 7:
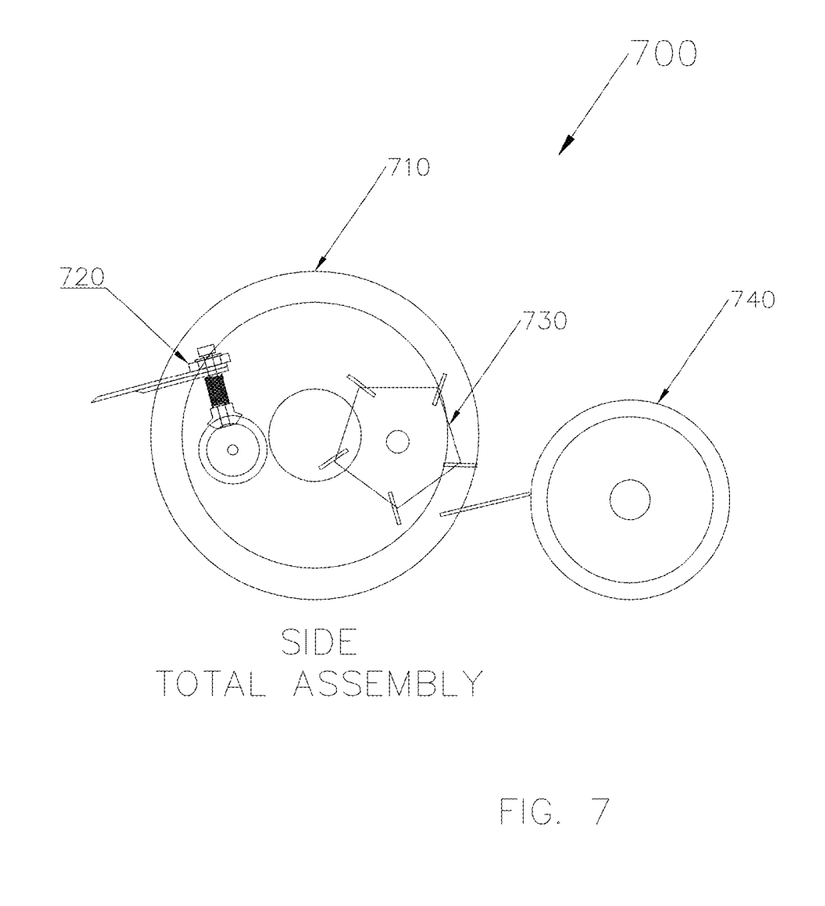
FIG. 7 illustrates a side view of a mower assembly with two cutting mechanisms, according to one embodiment of the invention.

FIG. 7 illustrates a side view of a push reel mower assembly with two cutting mechanisms (e.g., such as push reel mower assembly 600 of FIG. 6). Push reel mower assembly 700 includes wheel 710, a first cutting mechanism 720 (e.g., such as the cutting mechanism adaptation of FIG. 1), and a second cutting mechanism 730 (e.g., a traditional cutting mechanism). As shown, the first cutting mechanism 720 is located in front of and above the second cutting mechanism 720. This allows the first cutting mechanism 720 to cut vegetation to a first height and second cutting mechanism 730 to cut vegetation to a second height thereafter.

Push reel mower assembly 700 also includes a back wheel 740 connected to wheel 710. Together wheels 710 and 740 can provide a flat base for push reel mower assembly 700. Alternatively, push reel mower assembly can be assembled without back wheel 740. A handle can also be attached to push reel mower assembly 700 to help operate push reel mower assembly 700.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A lawn mower apparatus comprising:
a first cutting mechanism, wherein
the first cutting mechanism is configured to cut vegetation from an original height to a first height,
the first cutting mechanism comprises a rod coupled to at least two wheels of the lawn mower apparatus,
the rod is coupled to a set of static gears,
each static gear of the set of static gears is in contact with a corresponding second gear of a set of second gears,
each second gear of the set of second gears is coupled to a corresponding pin of a set of pins,
at least a first portion of each pin of the set of pins passes through a bracket,
the each pin of the set of pins is coupled to a corresponding one or more blades of a set of blades,
the corresponding one or more blades are coupled to the bracket via the corresponding pin and a corresponding spring,
the bracket is coupled to the at least two wheels of the lawn mower apparatus, and
the corresponding spring is coupled to the corresponding second gear and the corresponding one or more blades; and
a second cutting mechanism, wherein
the second cutting mechanism is configured to cut the vegetation to a second height,
the original height is greater than a height reachable by the second cutting mechanism,
the first height is a height reachable by the second cutting mechanism,
the first cutting mechanism is configured to cut the vegetation to the first height before the second cutting mechanism is configured to cut the vegetation to the second height, and
wherein a pushing motion activates the first and second cutting mechanisms.

2. The lawn mower apparatus of claim 1, wherein at least one of the corresponding one or more blades operates in a rotary motion.

3. The lawn mower apparatus of claim 1, wherein
a first blade of the corresponding one or more blades rotates, and
a second blade of the corresponding one or more blades is static.

4. The lawn mower apparatus of claim 3, wherein the second blade is offset from the first blade.

5. The lawn mower apparatus of claim 1, wherein
the corresponding spring applies pressure between the corresponding one or more blades.

6. The lawn mower apparatus of claim 1, wherein the first cutting mechanism further comprises:
an adjustable height bar, wherein
the adjustable height bar changes the height of the set of blades, and changing the height of the set of blades changes the first height to which the vegetation is cut.

7. The lawn mower apparatus of claim 1, further comprising:
a blade protection guard.

8. The lawn mower apparatus of claim 1, further comprising:
a handle.

9. The lawn mower apparatus of claim 1, wherein the first cutting mechanism is configured to be disengaged.

10. The lawn mower apparatus of claim 1, wherein
the corresponding one or more blades comprises at least one sharpened edge.

11. The lawn mower apparatus of claim 1, wherein
the pushing motion is a result of a user manually pushing the lawn mower apparatus.

12. The lawn mower apparatus of claim 1, wherein
the pushing motion causes a rotation of each of the at least two wheels, and
the rotation of the at least two wheels triggers a rotation of the rod.

13. The lawn mower apparatus of claim 12, wherein
the rotation of the rod triggers a rotation of the set of static gears,
the rotation of the set of static gears triggers a rotation of the set of second gears,
the rotation of the set of second gears triggers a rotation of the set of pins, the rotation of the set of pins triggers a rotation of at least some blades of the set of blades, and the rotation of the at least some of the blades of the set of blades cuts the vegetation that comes in contact with sharpened edges of the set of blades, thereby cutting the vegetation from the original height to the first height.

14. The lawn mower apparatus of claim 1, wherein the lawn mower apparatus further comprises:
a handle, and
a cable coupled to the handle, wherein
the cable is configured to engage and disengage the rod, and
the disengaging the rod prevents the first cutting mechanism from operating.

15. A lawn mower apparatus comprising:
a first cutting mechanism, wherein
the first cutting mechanism is configured to cut vegetation from an original height to a first height,
the first cutting mechanism comprises a rod coupled to at least two wheels of the lawn mower apparatus,
the rod is coupled to a set of static gears,
the set of static gears is in contact with a set of second gears,
the set of second gears is coupled to a set of pins,
the set of pins is coupled to a set of blades,
the set of blades is coupled to a bracket, and
the bracket is coupled to the at least two wheels of the lawn mower apparatus; and
a second cutting mechanism, wherein
the second cutting mechanism is configured to cut the vegetation to a second height,
the original height is greater than a height reachable by the second cutting mechanism,
the first height is a height reachable by the second cutting mechanism,
the first cutting mechanism is configured to cut the vegetation to the first height before the second cutting mechanism is configured to cut the vegetation to the second height, and
wherein a pushing motion activates the first and second cutting mechanisms.

16. The lawn mower apparatus of claim 15, wherein
the pushing motion causes a rotation of each of the at least two wheels, and
the rotation of the at least two wheels triggers a rotation of the rod.

17. The lawn mower apparatus of claim 16, wherein
the rotation of the rod triggers a rotation of the set of static gears,
the rotation of the set of static gears triggers a rotation of the set of second gears,
the rotation of the set of second gears triggers a rotation of the set of pins,
the rotation of the set of pins triggers a rotation of at least some blades of the set of blades, and
the rotation of the at least some of the blades of the set of blades cuts the vegetation that comes in contact with sharpened edges of the set of blades, thereby cutting the vegetation from the original height to the first height.

18. A lawn mower apparatus comprising:
a first cutting mechanism, wherein
the first cutting mechanism is configured to cut vegetation from an original height to a first height,
the first cutting mechanism comprises a rod coupled to at least two wheels of the lawn mower apparatus,
the rod is coupled to a set of static gears,
each static gear of the set of static gears is in contact with a corresponding second gear of a set of second gears,
each second gear of the set of second gears is coupled to a corresponding pin of a set of pins,
at least a first portion of each pin of the set of pins passes through a bracket,
the each pin of the set of pins is coupled to a corresponding one or more blades of a set of blades,
the corresponding one or more blades are coupled to the bracket via the corresponding pin and a corresponding spring,
the bracket is coupled to the at least two wheels of the lawn mower apparatus, and
the corresponding spring is coupled to the corresponding second gear and the corresponding one or more blades; and
a second cutting mechanism, wherein
the second cutting mechanism is configured to cut the vegetation to a second height,
the original height is greater than a height reachable by the second cutting mechanism,
the first height is a height reachable by the second cutting mechanism,
the first cutting mechanism is configured to cut the vegetation to the first height before the second cutting mechanism is configured to cut the vegetation to the second height,
wherein a pushing motion activates the first and second cutting mechanisms,
the pushing motion causes a rotation of each of the at least two wheels,
the rotation of the each of the at least two wheels triggers a rotation of the rod,
the rotation of the rod triggers a rotation of the set of static gears,
the rotation of the set of static gears triggers a rotation of the set of second gears,
the rotation of the set of second gears triggers a rotation of the set of pins,
the rotation of the set of pins triggers a rotation of at least some blades of the set of blades, and
the rotation of the at least some of the blades of the set of blades cuts the vegetation that comes in contact with sharpened edges of the set of blades, thereby cutting the vegetation from the original height to the first height.

\* \* \* \* \*